United States Patent
Nagata et al.

(10) Patent No.: US 12,447,859 B2
(45) Date of Patent: Oct. 21, 2025

(54) INFORMATION PROCESSING APPARATUS FOR GENERATING VEHICLE OPERATION PLANS BASED ON ELECTRICAL ENERGY CONSUMPTION

(71) Applicant: TOYOTA JIDOSHA KABUSHIKI KAISHA, Toyota (JP)

(72) Inventors: Yu Nagata, Chofu (JP); Ibuki Shimada, Miyoshi (JP); Toshihiro Nakamura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 18/460,586

(22) Filed: Sep. 4, 2023

(65) Prior Publication Data

US 2024/0083297 A1    Mar. 14, 2024

(30) Foreign Application Priority Data

Sep. 13, 2022  (JP) .................................. 2022-145581

(51) Int. Cl.
*B60L 58/12* (2019.01)
*B60W 60/00* (2020.01)
*G01C 21/34* (2006.01)

(52) U.S. Cl.
CPC ......... *B60L 58/12* (2019.02); *B60W 60/0053* (2020.02); *G01C 21/3469* (2013.01); *B60L 2240/60* (2013.01); *B60W 2510/244* (2013.01); *B60W 2556/45* (2020.02)

(58) Field of Classification Search
CPC . B60L 58/12; B60L 2240/60; B60W 60/0053; B60W 2556/45; B60W 2510/244; G01C 21/3469
See application file for complete search history.

(56) References Cited

U.S. PATENT DOCUMENTS

2018/0347997 A1* 12/2018 Fujimura ............ B60L 15/2045
2020/0064833 A1*  2/2020 Fox ................... B60W 60/0057
2022/0185336 A1*  6/2022 Kim ................... G01C 21/3492

FOREIGN PATENT DOCUMENTS

JP         2018205294 A     12/2018

* cited by examiner

*Primary Examiner* — James J Lee
*Assistant Examiner* — Steven Vu Nguyen
(74) *Attorney, Agent, or Firm* — KENJA IP LAW PC

(57) ABSTRACT

An information processing apparatus includes a controller that creates an electrical energy consumption map, for an autonomous vehicle, indicating electrical energy consumption of links in an operation route defined by an operation plan, calculates, based on the map, a first predicted value of total electrical energy consumption required for traveling the operation route, and compares the total electrical energy consumption indicated by the first predicted value with a SOC prior to operation of the vehicle, and when the SOC prior to operation does not satisfy the total electrical energy consumption, extracts links satisfying a predetermined condition as candidate links for switching to a manual driving section from among links designated as an autonomous driving section and changes the operation plan so that the SOC prior to operation satisfies the total electrical energy consumption by switching at least one of the extracted candidate links to the manual driving section.

6 Claims, 4 Drawing Sheets

INFORMATION PROCESSING APPARATUS FOR GENERATING VEHICLE OPERATION PLANS BASED ON ELECTRICAL ENERGY CONSUMPTION

CROSS-REFERENCE TO RELATED APPLICATION

This application claims priority to Japanese Patent Application No. 2022-145581 filed on Sep. 13, 2022, the entire contents of which are incorporated herein by reference.

TECHNICAL FIELD

The present disclosure relates to an information processing apparatus.

BACKGROUND

Technology related to operation plans for vehicles operated by autonomous driving is known. For example, Patent Literature (PTL) 1 discloses technology for outputting information indicating the electrical energy consumption of modules used for autonomous driving of vehicles.

CITATION LIST

Patent Literature

PTL 1: JP 2018-205294 A

SUMMARY

The electrical energy consumption of an autonomous driving system that implements operational control of a vehicle operated by autonomous driving (hereinafter also referred to as an "autonomous vehicle") varies depending on road conditions, such as the state of road maintenance. The electrical energy consumption of an autonomous driving system also tends to vary among developers of autonomous driving systems, even when road conditions are the same. Therefore, in establishing operation plans for autonomous vehicles, it is necessary to consider the characteristics of each autonomous driving system as matter specific to autonomous vehicles. However, conventional technology does not take these characteristics into account and thus has room for improvement.

It would be helpful to improve technology for operation plans of autonomous vehicles.

An information processing apparatus according to an embodiment of the present disclosure is an information processing apparatus including a controller configured to:
- create an electrical energy consumption map, for a vehicle operated by autonomous driving, indicating an electrical energy consumption of a plurality of links included in an operation route defined by an operation plan;
- calculate, based on the electrical energy consumption map, a first predicted value that is a predicted value of a total electrical energy consumption required for traveling the operation route; and
- compare the total electrical energy consumption indicated by the first predicted value with a state of charge (SOC) prior to operation of the vehicle, and in a case in which it is determined that the SOC prior to operation does not satisfy the total electrical energy consumption, extract links satisfying a predetermined condition as candidate links for switching to a manual driving section from among links, included in the plurality of links, designated as an autonomous driving section and change the operation plan so that the SOC prior to operation satisfies the total electrical energy consumption by switching at least one candidate link among the extracted candidate links to the manual driving section.

According to an embodiment of the present disclosure, technology for operation plans of autonomous vehicles is improved.

DETAILED DESCRIPTION

Hereinafter, an embodiment of the present disclosure will be described.

Outline of Embodiment

Figure 1:
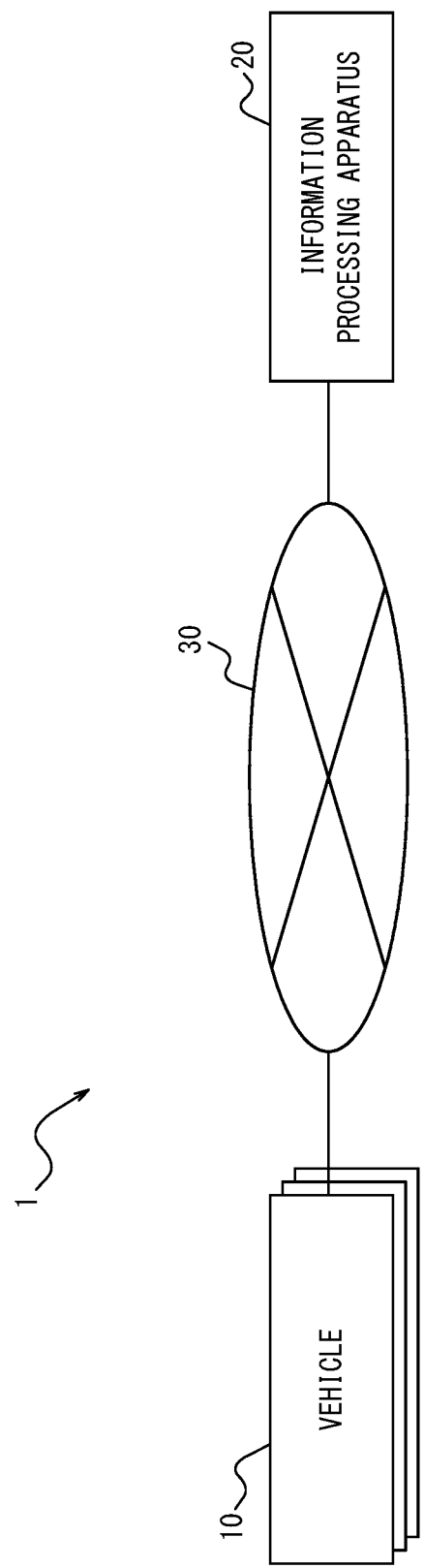
FIG. 1 is a block diagram illustrating a schematic configuration of a system according to an embodiment of the present disclosure.

An outline of a system 1 according to an embodiment of the present disclosure will be described with reference to FIG. 1. The system 1 includes vehicles 10 and an information processing apparatus 20. The vehicles 10 and the information processing apparatus 20 are communicably connected to a network 30 including, for example, the Internet, a mobile communication network, or the like.

Each vehicle 10 is an automobile, for example, but is not limited to this and may be any vehicle that runs on charged energy. The automobile is, for example, a Hybrid Electric Vehicle (HEV), a Plug-in Hybrid Electric Vehicle (PHEV), a Battery Electric Vehicle (BEV), a Fuel Cell Electric Vehicle (FCEV), or the like, but is not limited to these. In the present embodiment, the vehicle 10 is a vehicle driven by a driver in a manual driving section and is automated at any level of operation in an autonomous driving section. Hereafter, a vehicle whose driving is automated at any level is also referred to as a "vehicle operated by autonomous driving" or "autonomous vehicle". The level of automation is, for example, one of level 1 to level 5 according to the classification of the Society of Automotive Engineers (SAE). The vehicle 10 may be a dedicated Mobility as a Service (MaaS) vehicle. An autonomous driving system that controls autonomous driving is provided on board the vehicle 10. The on-board autonomous driving system is an Autonomous Driving Kit (ADK) in the present embodiment, but this configuration is not limiting. The vehicle 10 moves along an operation route defined in an operation plan designated prior to operation. When the operation plan is changed, the vehicle 10 moves along the operation route defined in the changed operation plan. The number of vehicles 10 included in the system 1 may be freely determined.

The information processing apparatus 20 is, for example, a computer such as a server apparatus. The information processing apparatus 20 can communicate with the vehicle 10 via the network 30. The information processing apparatus 20 can acquire any information about the vehicle 10, such as vehicle information from each vehicle 10. The "vehicle information" is information indicating the status of the vehicle 10. The vehicle information includes, for example, information indicating the position, orientation, speed, acceleration, shift position, driving distance, number of boarding/alighting users, and electrical energy consumption of the vehicle 10.

In the present embodiment, the system 1 is used in a passenger transportation service using a bus, as the vehicle 10, that travels along an operation route defined by an operation plan. The operation route includes sections where the vehicle 10 is driven by a driver (hereinafter also referred to as a "manual driving section") and sections where the vehicle 10 is operated by autonomous driving (hereinafter also referred to as an "autonomous driving section").

First, an outline of the present embodiment will be described, and details thereof will be described later. The information processing apparatus creates an electrical energy consumption map, for a vehicle operated by autonomous driving, indicating the electrical energy consumption of a plurality of links included in an operation route defined by an operation plan. The information processing apparatus 20 calculates, based on the electrical energy consumption map, a first predicted value that is a predicted value of the total electrical energy consumption required for traveling the operation route. The information processing apparatus 20 compares the total electrical energy consumption indicated by the first predicted value with the State of Charge (SOC) prior to operation of the vehicle to determine whether the SOC prior to operation satisfies the total electrical energy consumption. In a case in which it is determined that the SOC prior to operation does not satisfy the total electrical energy consumption, the information processing apparatus 20 extracts links satisfying a predetermined condition as candidate links for switching to the manual driving section from among links, included in the plurality of links, designated as the autonomous driving section. The information processing apparatus 20 changes the operation plan so that the SOC prior to operation satisfies the total electrical energy consumption by switching at least one candidate link among the extracted candidate links to the manual driving section.

In this way, according to the present embodiment, the operation plan is changed based on the electrical energy consumption map. Therefore, if an electrical energy consumption map is created for each autonomous driving system, for example, the operation plan can be modified to match the characteristics of the autonomous driving system installed in the vehicle 10. Therefore, technology for operation plans of autonomous vehicles is improved in that it is easier to establish operation plans that take into account the characteristics of the autonomous driving system installed in the vehicle 10.

Next, configurations of the system 1 will be described in detail.

<Configuration of Vehicle>

Figure 2:
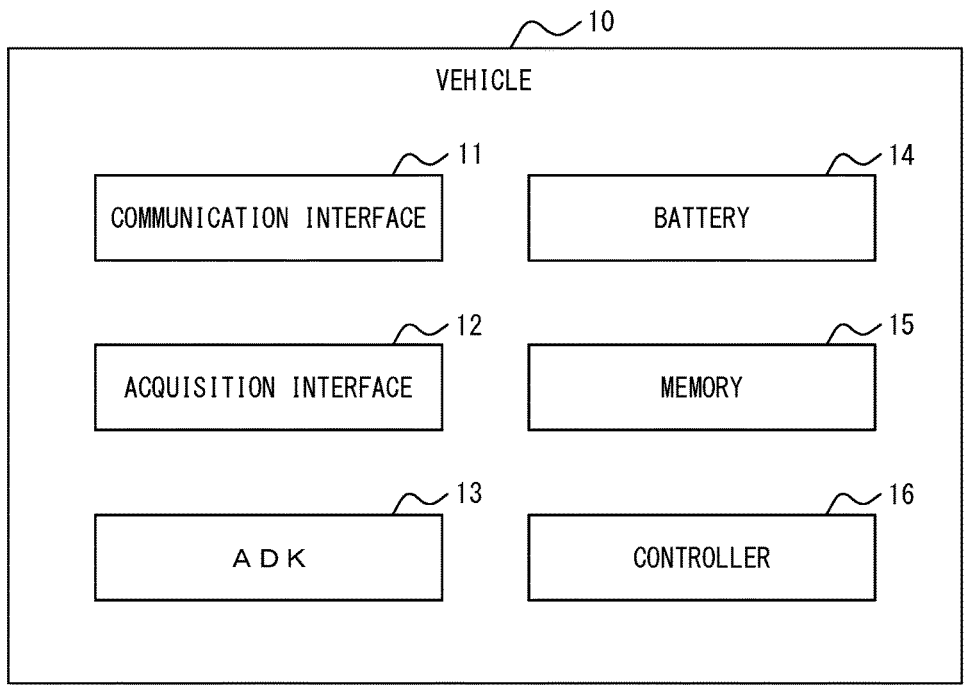
FIG. 2 is a block diagram illustrating a schematic configuration of a vehicle.

As illustrated in FIG. 2, each vehicle 10 includes a communication interface 11, an acquisition interface 12, an ADK 13, a battery 14, a memory 15, and a controller 16.

The communication interface 11 includes at least one interface for communication for connecting to the network. The interface for communication is compliant with mobile communication standards such as the 4th generation (4G) standard or the 5th generation (5G) standard, for example, but these examples are not limiting. In the present embodiment, the vehicle 10 communicates with the information processing apparatus 20 via the communication interface 11 and the network 30.

The acquisition interface 12 includes one or more apparatuses configured to acquire positional information for the vehicle 10. Specifically, the acquisition interface 12 includes a receiver corresponding to the Global Positioning System (GPS), for example, but is not limited to this and may include a receiver corresponding to any satellite positioning system. The acquisition interface 12 includes any sensor module capable of acquiring vehicle information for the vehicle 10. For example, the sensor module may include a vibration sensor, an infrared sensor, a speed sensor, an angular velocity sensor, an acceleration sensor, a geomagnetic sensor, a distance sensor such as LiDAR (light detection and ranging), a temperature sensor, a power monitor, or combinations of these. The power monitor detects the electrical energy consumption of the vehicle 10 over time. The electrical energy consumption of the vehicle 10 refers to the electrical energy consumption required for the vehicle 10 to run, including, for example, the electrical energy consumption of the motor and autonomous driving system, as well as the electrical energy consumption required to run the air conditioning system and electrical components.

The ADK 13 is an Electronic Control Unit (ECU) that includes a computer with embedded autonomous driving software. The ADK 13 is configured to be capable of performing SAE levels 1 to 5, for example, as operational control of the vehicle 10. At least one of the sensor modules included in the acquisition interface 12 may be incorporated in the ADK 13. The vehicle 10 can drive autonomously according to driving control that can be performed by the ADK 13, which is used to transmit control requests to the controller 16, described below.

The battery 14 is a secondary cell that can be repeatedly charged and discharged. The vehicle 10 is driven by electrical energy supplied from the battery 14 to the motor and other drive mechanisms. The battery 14 may, for example, be a lithium-ion battery, a nickel-metal hydride battery, a lead-acid battery, or the like. In a wired or wireless manner, the battery 14 is connected to and charged by a charging apparatus installed at any charging base, such as a vehicle base provided by a bus operator.

The memory 15 includes one or more memories. The memories are semiconductor memories, magnetic memories, optical memories, or the like, for example, but are not limited to these. The memories included in the memory 15 may each function as, for example, a main memory, an auxiliary memory, or a cache memory. The memory 15 stores any information used for operations of the vehicle 10. For example, the memory 15 may store a system program, an application program, embedded software, map information, and the like. The map information is a numerical map (including basic map information, numerical elevation data, and the like) provided by the Geospatial Information Authority of Japan in the present embodiment, but this example is not limiting, and the map information may include any geospatial information. The information stored in the memory 15 may be updated with, for example, information acquired from the network 30 via the communication interface 11.

The controller 16 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 16 controls the operations of the entire vehicle 10.

In the present embodiment, the controller 16 can perform autonomous driving of the vehicle 10 in response to a control request from the ADK 13. For example, the controller 16 can switch the operation mode of the vehicle 10, i.e., manual driving or autonomous driving, by setting the ADK 13 to ON in the autonomous driving section and OFF in the manual driving section.

In the present embodiment, the controller 16 may transmit the vehicle information acquired via the acquisition interface 12 to the information processing apparatus 20 via the communication interface 11 and the network 30.

In the present embodiment, the controller 16 can acquire information indicating the electrical energy consumption (for example, kWh) and information indicating the SOC (for example, a continuous value from 0% to 100%) from the battery 14.

<Information Processing Apparatus Configuration>

Figure 3:
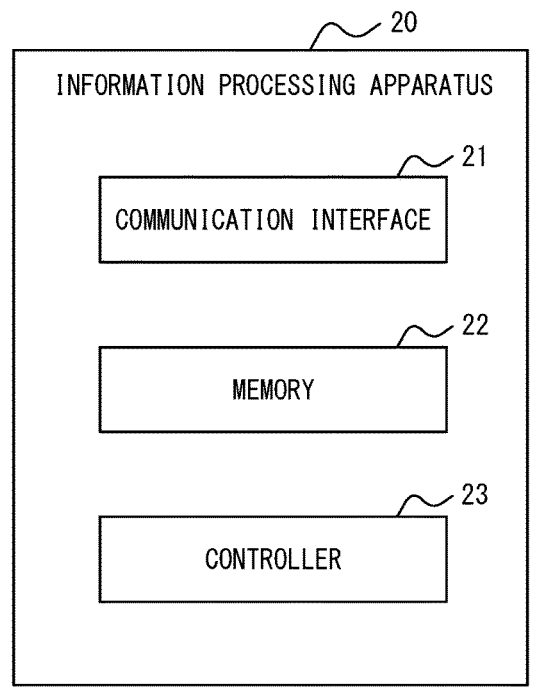
FIG. 3 is a block diagram illustrating a schematic configuration of an information processing apparatus.

As illustrated in FIG. 3, the information processing apparatus 20 includes a communication interface 21, a memory 22, and a controller 23.

The communication interface 21 includes at least one interface for communication for connecting to the network 30. The interface for communication may be compliant with, for example, mobile communication standards, wired local area network (LAN) standards, or wireless LAN standards, but these examples are not limiting. The interface for communication may be compliant with any appropriate communication standards. In the present embodiment, the information processing apparatus communicates with the vehicle 10 via the communication interface 21 and the network 30.

The memory 22 includes one or more memories. The memories included in the memory 22 may each function as, for example, a main memory, an auxiliary memory, or a cache memory. The memory 22 stores any information used for operations of the information processing apparatus 20. For example, the memory 22 may store a system program, an application program, a database, map information, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire information processing apparatus 20.

In the present embodiment, the controller 23 receives the vehicle information for each vehicle 10 from the communication interface 11 of the vehicle 10 via the communication interface 21 and the network 30.

<Flow of Operations of Information Processing Apparatus>

Figure 4:
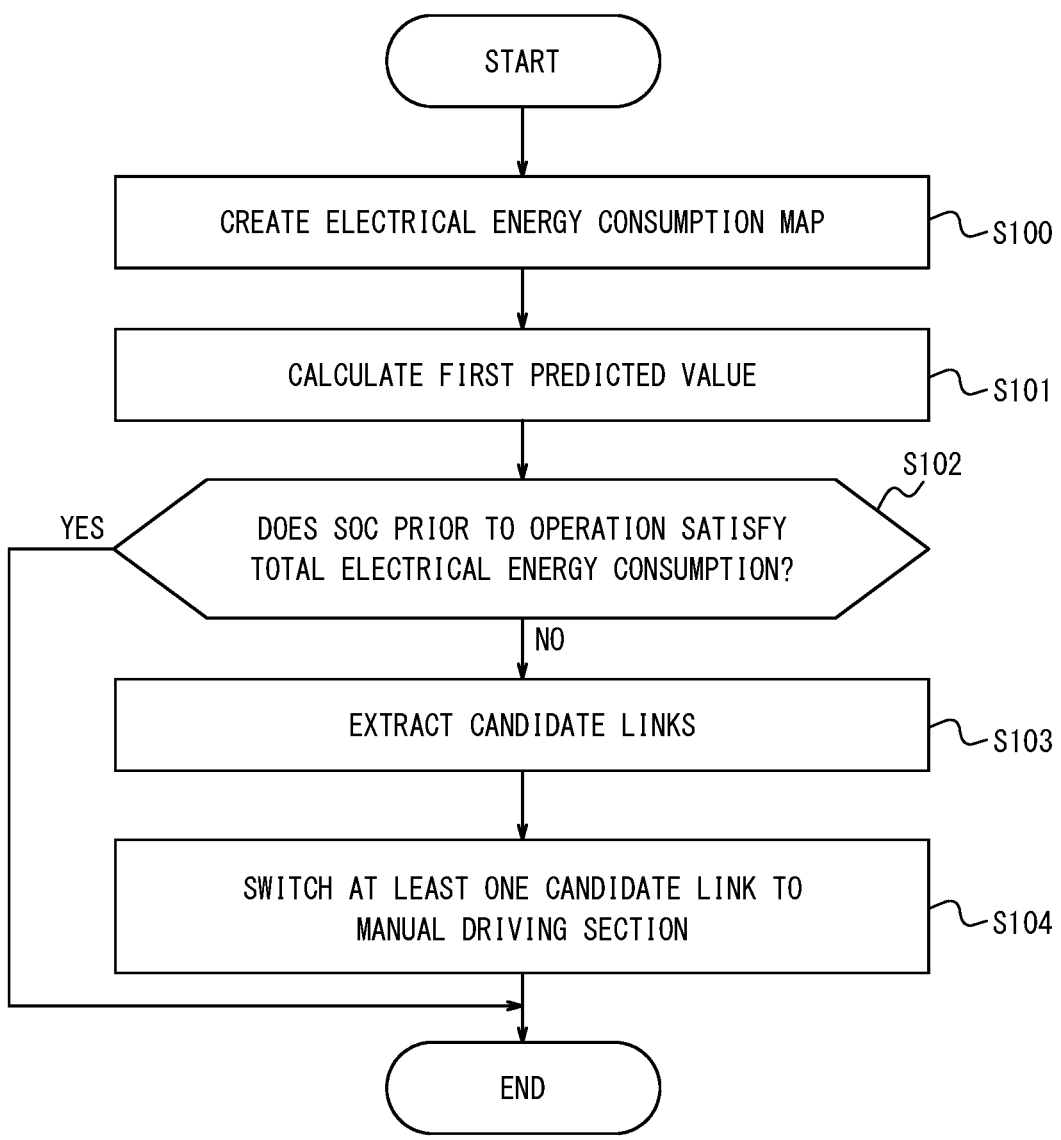
FIG. 4 is a flowchart illustrating operations of the information processing apparatus according to a first embodiment.

Operations of the information processing apparatus 20 according to a first embodiment will be described with reference to FIG. 4. The operations in FIG. 4 correspond to a method according to the present embodiment. The operations in FIG. 4 can be performed at any time, such as when the information processing apparatus 20 receives the operation plan.

Step S100: the controller 23 of the information processing apparatus creates an electrical energy consumption map, for the vehicle 10 operated by autonomous driving, indicating the electrical energy consumption of a plurality of links included in an operation route defined by an operation plan.

Specifically, the controller 23 acquires an operation plan for the vehicle 10. Any method can be employed to acquire the operation plan. For example, the controller 23 may acquire the operation plan for the vehicle 10 by reading the operation plan stored in the database of the memory 22.

The controller 23 calculates the electrical energy consumption of each link included in the operation route defined by the acquired operation plan. A link is a road segment with endpoints (nodes) at intersections or dead ends on the road. Each link has two nodes: a starting node and an ending node. Links and nodes have absolute positional information, such as two-dimensional coordinate data including latitude and longitude, indicating their respective positions on the map.

Any method can be employed to calculate the electrical energy consumption of each link included in the operation route. For example, data indicating the history of electrical energy consumption required for the vehicle 10 to drive on each link may be acquired for each ADK 13 during an aggregation period, and a representative value (for example, the average) of electrical energy consumption for each link may be calculated. In this case, the controller 23 can set the calculated representative value as the electrical energy consumption of each link in the corresponding ADK 13. The history of the electrical energy consumption required for the vehicle 10 to run may be the history of the electrical energy consumption of the motor and autonomous driving system (here, the ADK 13), as well as the electrical energy consumption required to run the air conditioning system and electrical components. For example, the aggregation period may be the past month or longer before the operation date (in the case of emphasizing a trend in the electrical energy consumption immediately preceding the operation date), a one day or longer period that includes the date corresponding to the operation date in the previous year (in the case of emphasizing seasonal variation in the electrical energy consumption), or both.

Based on the electrical energy consumption of each set link, the controller 23 creates an electrical energy consumption map corresponding to the ADK 13 installed in the vehicle 10. Any method can be employed to create the electrical energy consumption map. For example, the controller 23 may create an electrical energy consumption map by mapping the set electrical energy consumption onto each link on a map. The controller 23 may store the created electrical energy consumption map in the memory 22.

Here, the performance of the autonomous driving system installed in the vehicle 10 tends to vary from one developer to another, as described above. Therefore, even if the operation route is the same, the total electrical energy consumption will differ for a different autonomous driving system installed in the vehicle 10. In the present embodiment, the controller 23 therefore does not uniformly calculate the predicted electrical energy consumption of each link regardless of the autonomous driving system installed in the vehicle 10, but rather calculates the predicted electrical energy consumption of each link for each autonomous driving system (here, ADK 13) installed in the vehicle 10. The predicted electrical energy consumption of each link specific to each individual ADK 13 is thereby indicated in the electrical energy consumption map created according to the present embodiment.

Step S101: the controller 23 calculates, based on the electrical energy consumption map created in step S100, a first predicted value that is a predicted value of the total electrical energy consumption required for traveling the operation route.

Specifically, the controller 23 reads the electrical energy consumption map corresponding to the ADK 13 from the memory 22 to acquire the electrical energy consumption of each link in the operation route and calculates the total electrical energy consumption, predicted from the acquired electrical energy consumption, as the first predicted value. Any appropriate method can be employed to calculate the first predicted value. Although a process to simply tally the electrical energy consumption of each link included in the operation route is possible, the first predicted value may, for example, also be calculated using machine learning, such as deep learning, based on the electrical energy consumption of each link calculated in step S100. For example, by inputting each link included in the operation route into a prediction model for predicting electrical energy consumption to acquire a prediction result from the prediction model, the electrical energy consumption of each link on the day of operation for the ADK 13 installed in the vehicle 10 may be predicted. The controller 23 can generate or update the prediction model by performing machine learning, in association with the ADK 13 installed in the vehicle 10, on data indicating the history of electrical energy consumption of each link in the corresponding ADK 13. The prediction model is generated or updated for each autonomous driving system that controls autonomous driving of the vehicle 10 (i.e., for each individual ADK 13) or for each developer of autonomous driving systems. Teacher data for machine learning can be created by associating each link with past electrical energy consumption as a label. This teacher data can then be used to perform machine learning with known algorithms to generate a learned model as a prediction model. By acquiring the prediction results from the generated learned model as the predicted electrical energy consumption, the controller 23 can calculate the predicted electrical energy consumption of each link and calculate the sum of the calculated predicted values as the first predicted value.

Step S102: the controller 23 compares the total electrical energy consumption indicated by the first predicted value with the SOC prior to operation of the vehicle 10 to determine whether the SOC prior to operation satisfies the total electrical energy consumption. In a case in which it is determined that the SOC prior to operation satisfies the total electrical energy consumption (step S102: Yes), the process ends. Conversely, in a case in which it is determined that the SOC prior to operation does not satisfy the total electrical energy consumption (step S102: No), the process advances to step S103.

Specifically, the controller 23 acquires information indicating the SOC (in this case, a continuous value from 0% to 100%) from the battery 14 of the vehicle 10 prior to operation. In the present embodiment, the SOC of the battery 14 of the vehicle 10 prior to operation is also referred to as the "SOC prior to operation". The controller 23 converts the acquired SOC prior to operation to the remaining capacity of the battery 14. The controller 23 compares the total electrical energy consumption indicated by the first predicted value with the remaining capacity of the battery 14. As a first example, in a case in which the total electrical energy consumption indicated by the first predicted value is 60 kWh and the remaining capacity converted from an SOC prior to operation of 80% is 80 kWh, the controller 23 determines that the SOC prior to operation satisfies the total electrical energy consumption. As a second example, in a case in which the total electrical energy consumption indicated by the first predicted value is 60 kWh and the remaining capacity converted from an SOC prior to operation of 50% is 50 kWh, the controller 23 determines that the SOC prior to operation does not satisfy the total electrical energy consumption.

Step S103: in a case in which it is determined that the SOC prior to operation does not satisfy the total electrical energy consumption (step S102: No), the controller 23 extracts links satisfying a predetermined condition (hereinafter also referred to as the "first condition") as candidate links for switching to the manual driving section from among links, included in the plurality of links, designated as the autonomous driving section.

The first condition can be defined freely. For example, the first condition may be that the average electrical energy consumption per unit distance exceeds a reference value. The reference value can be set freely but may, for example, be the average of the electrical energy consumption per unit distance (here, 1 km) of a plurality of links. In this case, the controller 23 extracts links for which the average electrical energy consumption per unit distance exceeds the reference value as candidate links from among the links, included in the plurality of links, designated as an autonomous driving section.

The controller 23 may switch the at least one candidate link to the manual driving section on a priority basis starting from the candidate link with the highest electrical energy consumption per unit distance. For example, suppose that the average electrical energy consumption per unit distance for a plurality of links is 0.15 kWh/km, the average electrical energy consumption per unit distance for link AB is 0.07 kWh/km, and the average electrical energy consumption per unit distance for link BC is 0.20 kWh/km. In this case, link BC corresponds to a link for which the average electrical energy consumption per unit distance exceeds the reference value. Therefore, the controller 23 prioritizes link BC over link AB and switches link BC to the manual driving section. Links with a high electrical energy consumption per unit distance are typically links with no guardrails, with blurred lane marking, or the like, for which the electrical energy consumption of the distance sensors included in the acquisition interface 12 of the vehicle 10 is likely to be higher than other links (such as links with guardrails). In a case in which two or more links are identified as having an equivalent average electrical energy consumption per unit distance that exceeds the reference value, the controller 23 may switch to the manual driving section starting with the link that has the shorter travel distance. This will help to minimize the increase in distance of the manual driving section.

Step S104: the controller 23 changes the operation plan so that the SOC prior to operation satisfies the total electrical energy consumption by switching at least one candidate link among the candidate links extracted in step S103 to the manual driving section.

Specifically, the controller 23 switches at least one candidate link that satisfies the first condition to the manual driving section and turns the ADK 13 off at that section. The controller 23 adds candidate links to switch to the manual driving section until the remaining capacity of the battery 14 corresponding to the SOC prior to operation is equal to or greater than the total electrical energy consumption and turns the ADK 13 off in the corresponding sections. The controller 23 can thereby change the operation plan so that the SOC prior to operation satisfies the total electrical energy consumption.

Here, in a case in which the objective is simply to reduce electrical energy consumption, it suffices to switch the links with the highest electrical energy consumption to manual on a priority basis. In this case, however, the manual driving section tends to grow longer. Links are therefore switched to manual on a priority basis starting from the link with the highest electrical energy consumption per unit distance in the present embodiment to facilitate minimizing the distance of the manual driving section. Consequently, it is easier to reduce the burden on a remote observer of the vehicle 10 while controlling an increase in the burden on the driver of the vehicle 10.

In this way, according to the first embodiment, the operation plan is changed based on the electrical energy consumption map. Therefore, if an electrical energy consumption map is created for each autonomous driving system, for example, the operation plan can be modified to match the characteristics of the autonomous driving system (here, the ADK 13) installed in the vehicle 10. Therefore, technology for operation plans of autonomous vehicles is improved in that it is easier to establish operation plans that take into account the characteristics of the autonomous driving system installed in the vehicle 10.

Figure 5:
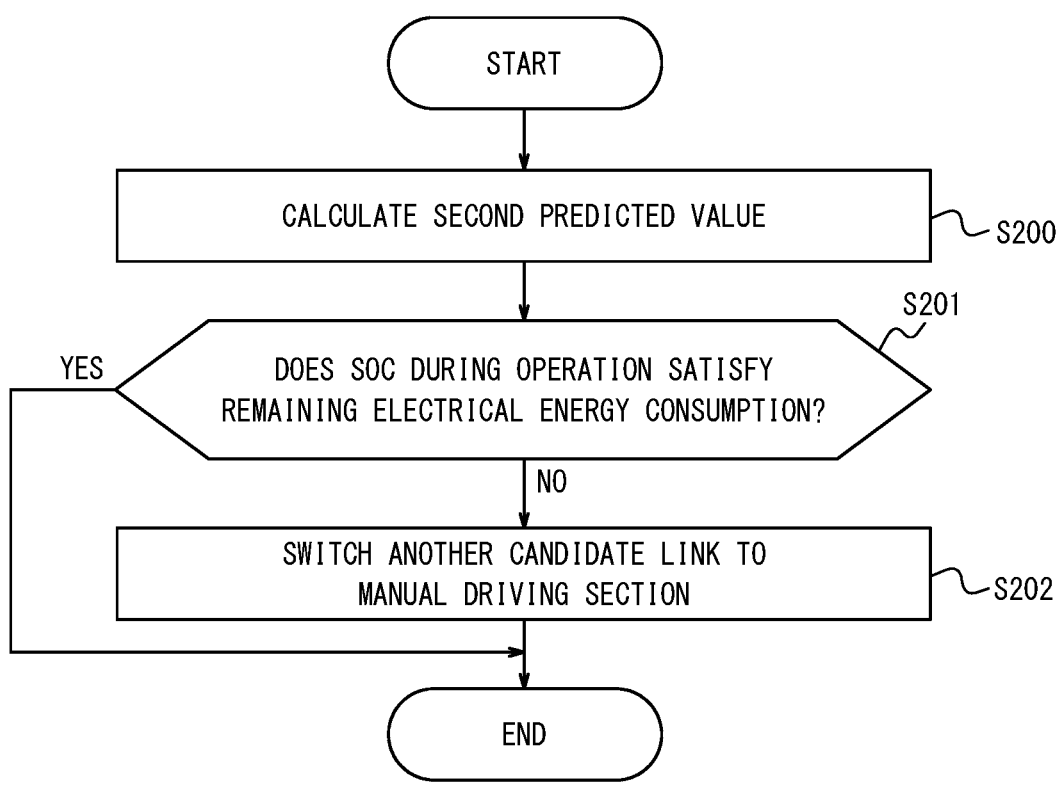
FIG. 5 is a flowchart illustrating operations of the information processing apparatus according to a second embodiment.

Operations of the information processing apparatus 20 according to the second embodiment are described next with reference to FIG. 5. The operations in FIG. 5 correspond to a method according to the present embodiment. Whereas the above-described operations in FIG. 4 are executed before the vehicle 10 begins operation, the operations in FIG. 5 are executed after the vehicle 10 begins operation. The operations in FIG. 5 are executed repeatedly, for example over a predetermined period, during operation of the vehicle 10. The predetermined period can be freely determined.

Step S200: the controller 23 calculates a second predicted value, which is the predicted value of the remaining electrical energy consumption required for traveling the remaining portion of the operation route. The remaining portion of the operation route is the portion of the operation route that the vehicle 10 is scheduled to travel (the un-traveled portion).

Any appropriate method can be employed to calculate the second predicted value. For example, the controller 23 may predict the remaining electrical energy consumption by considering the occupancy rate and the utilization rate of the air conditioning system of the vehicle 10 after the start of operation. The occupancy rate of the vehicle 10 may, for example, be calculated by predicting the number of passengers based on historical data on the count, made by a sensor at the entrance/exit, of the number of users boarding and alighting from the vehicle 10. The utilization rate of the air conditioning system may be calculated based on the expected temperature during the corresponding time period. Typically, the higher the occupancy rate of the vehicle 10, the higher the cabin temperature, and the higher the utilization rate of the air conditioning system. The predicted value of the remaining electrical energy consumption may therefore be calculated so that the higher the occupancy rate of the vehicle 10, the larger the value. The controller 23 can take the calculated predicted value of the remaining electrical energy consumption as the calculated second predicted value.

Step S201: the controller 23 compares the remaining electrical energy consumption indicated by the second predicted value with the SOC during operation of the vehicle 10 to determine whether the SOC during operation satisfies the remaining electrical energy consumption. In a case in which it is determined that the SOC during operation satisfies the remaining electrical energy consumption (step S201: Yes), the process ends. Conversely, in a case in which it is determined that the SOC during operation does not satisfy the remaining electrical energy consumption (step S201: No), the process advances to step S202.

Specifically, the controller 23 acquires information indicating the SOC from the battery 14 of the vehicle 10 during operation. In the present embodiment, the SOC of the battery 14 of the vehicle 10 during operation is also referred to as the "SOC during operation". The controller 23 converts the acquired SOC during operation to the remaining capacity of the battery 14. The controller 23 compares the remaining electrical energy consumption indicated by the second predicted value with the remaining capacity of the battery 14. As a third example, in a case in which the remaining electrical energy consumption indicated by the second predicted value is 30 kWh and the remaining capacity converted from an SOC prior to operation of 40% is 40 kWh, the controller 23 determines that the SOC during operation satisfies the remaining electrical energy consumption. As a fourth example, in a case in which the remaining electrical energy consumption indicated by the second predicted value is 30 kWh and the remaining capacity converted from an SOC prior to operation of 20% is 20 kWh, the controller 23 determines that the SOC during operation does not satisfy the remaining electrical energy consumption.

Step S202: in a case in which it is determined that the SOC during operation does not satisfy the remaining electrical energy consumption (step S201: No), the controller 23 changes the operation plan so that the SOC during operation satisfies the remaining electric al energy consumption by switching, to the manual driving section, another candidate link that has not been switched to the manual driving section among the candidate links.

Specifically, the controller 23 extracts one or more candidate links, that have not been switched to the manual driving section and that satisfy a second condition different from the first condition, as another candidate link from among the candidate links extracted in step S103.

The second condition can be defined freely. For example, the second condition may be that the travel distance is the shortest. In this case, the controller 23 extracts the link with the shortest travel distance, among the candidate links extracted in step S103 and not switched to the manual driving section in step S104, as another candidate link. The controller 23 extracts candidate links that satisfy the second condition in order of the shortest travel distance until the remaining capacity of the battery 14 corresponding to the SOC during operation becomes equal to or greater than the remaining electrical energy consumption. The controller 23 can then change the operation plan so that the SOC during operation satisfies the remaining electrical energy consumption by turning the ADK 13 off in the sections of the extracted candidate links.

In this way, according to the second embodiment, an additional candidate link can be switched to the manual driving section while the vehicle 10 is in operation, and the ADK 13 can be turned off in that section, thereby reducing the electrical energy consumption of the vehicle 10. In other words, the second embodiment facilitates a reduction in the electrical energy consumption of the vehicle 10 in accordance with the conditions on the day of operation. Also, in a case in which the number of boarding and alighting users is greater than expected and delays occur in the operation schedule, the manual driving sections can be increased appropriately in the present embodiment to match the conditions on the day of operation. As a result, it is easier to eliminate delays in the operation schedule by adjusting the speed through manual operation as appropriate, for example by accelerating departures when arrivals are delayed.

As described above, the information processing apparatus 20 according to the present embodiment creates an electrical energy consumption map, for a vehicle 10 operated by autonomous driving, indicating the electrical energy consumption of a plurality of links included in an operation route defined by an operation plan. The information processing apparatus 20 calculates, based on the electrical energy consumption map, a first predicted value that is a predicted value of the total electrical energy consumption required for traveling the operation route. The information processing apparatus 20 compares the total electrical energy consumption indicated by the first predicted value with the SOC prior to operation of the vehicle 10 to determine whether the SOC prior to operation satisfies the total electrical energy consumption. In a case in which it is determined that the SOC prior to operation does not satisfy the total electrical energy consumption, the information processing apparatus 20 extracts links satisfying a predetermined condition as candidate links for switching to the manual driving section from among links, included in the plurality of links, designated as the autonomous driving section. The information processing apparatus 20 changes the operation plan so that the SOC prior to operation satisfies the total electrical energy consumption by switching at least one candidate link among the extracted candidate links to the manual driving section.

According to this configuration, the operation plan is changed based on the electrical energy consumption map. Therefore, if an electrical energy consumption map is created for each autonomous driving system, for example, the operation plan can be modified to match the characteristics of the autonomous driving system installed in the vehicle 10. Therefore, technology for operation plans of autonomous vehicles is improved in that it is easier to establish operation plans that take into account the characteristics of the autonomous driving system installed in the vehicle 10.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in one variation of the present embodiment, the vehicle 10 may be a semi-demand bus that makes at least one stop on an operation route in response to a request by the user. In this case, the controller 23 may change the location at which the user boards or alights to a different location than the stop designated by the user so that the SOC during operation satisfies the remaining electrical energy consumption. For example, assume that stop A is designated by the user as the boarding location, and that on the route with the shortest travel distance, a link with high electrical energy consumption continues beyond stop A. In this case, the controller 23 may avoid traveling on the high electrical energy consumption link beyond stop A by designating stop B, which is before a link with relatively low electrical energy consumption, as the boarding location. In other words, the controller 23 can reduce the remaining electrical energy consumption by changing the operation route from the route with the shortest travel distance to the route with the lowest electrical energy consumption. As a result, the controller 23 can more easily change the operation plan so that the SOC during operation satisfies the remaining electrical energy consumption. At this time, a limit for changing the boarding location (for example, within 100 m from the initial boarding location) may be set in consideration of the burden on the user. The controller 23 can provide notification of a request to change the boarding location by transmitting stop B to the terminal apparatus of the user for output.

For example, an embodiment in which the configuration and operations of the information processing apparatus 20 in the above embodiment are distributed to multiple computers capable of communicating with each other can be implemented. For example, an embodiment in which some or all of the components of the information processing apparatus 20 are provided in the vehicles 10 can also be implemented. For example, a navigation apparatus installed in the vehicle 10 may be equipped with some or all of the components of the information processing apparatus 20.

For example, an embodiment in which a general purpose computer functions as the information processing apparatus 20 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing apparatus comprising a first controller and a communication interface, the first controller being configured to:
   acquire, from a database, an operation plan for a vehicle, the vehicle comprising a second controller and performing autonomous driving operated by the second controller;
   create an electrical energy consumption map, for the vehicle, indicating an electrical energy consumption of a plurality of links included in an operation route defined by the operation plan;
   calculate, based on the electrical energy consumption map, a first predicted value that is a predicted value of a total electrical energy consumption required for traveling the operation route;
   communicate, via the communication interface with the vehicle, to acquire information indicating a state of charge prior to operation of the vehicle;
   compare the total electrical energy consumption indicated by the first predicted value with the state of charge prior to operation of the vehicle; and
   in a case in which it is determined that the state of charge prior to operation does not satisfy the total electrical energy consumption, extract links satisfying a predetermined condition as candidate links for switching to a manual driving section from among links, included in the plurality of links, designated as an autonomous driving section and change the operation plan so that the state of charge prior to operation satisfies the total electrical energy consumption by switching at least one candidate link among the extracted candidate links to the manual driving section, wherein
   upon the operation plan being changed by the first controller, the second controller operates the vehicle to move along the operation route defined in the changed operation plan, the predetermined condition is that an average electrical energy consumption per unit distance exceeds a reference value, and the first controller is configured to switch the at least one candidate link to the manual driving section on a priority basis starting from a candidate link with a highest electrical energy consumption per unit distance.

2. The information processing apparatus according to claim 1, wherein the first controller is configured to create the electrical energy consumption map for each autonomous driving system that controls the autonomous driving of the vehicle.

3. The information processing apparatus according to claim 1, wherein the first controller is configured to calculate a second predicted value that is a predicted value of a remaining electrical energy consumption required for traveling a remaining portion of the operation route, and compare the remaining electrical energy consumption indicated by the second predicted value with a state of charge during operation of the vehicle, and in a case in which it is determined that the state of charge during operation does not satisfy the remaining electrical energy consumption, change the operation plan so that the state of charge during operation satisfies the remaining electrical energy consumption by switching, to the manual driving section, another candidate link that has not been switched to the manual driving section among the candidate links.

4. The information processing apparatus according to claim 3, wherein the vehicle is a semi-demand bus configured to make at least one stop on the operation route in response to a request by a user, and the first controller is configured to change a location at which the user boards or alights to a different location than a stop designated by the user so that the state of charge during operation satisfies the remaining electrical energy consumption.

5. The information processing apparatus according to claim 1, wherein the second controller is configured to autonomously switch an operation mode of the vehicle between manual driving and autonomous driving in accordance with the operation plan, such that the vehicle operates in autonomous driving while in the autonomous driving section and in manual driving while in the manual driving section.

6. A system comprising the information processing apparatus according to claim 1 and the vehicle, wherein the second controller is configured to autonomously switch an operation mode of the vehicle between manual driving and autonomous driving in accordance with the operation plan, such that the vehicle operates in autonomous driving while in the autonomous driving section and in manual driving while in the manual driving section.

\* \* \* \* \*